(12) United States Patent
Centner

(10) Patent No.: US 6,979,799 B2
(45) Date of Patent: *Dec. 27, 2005

(54) SYSTEM AND METHOD FOR OPERATING AND LOCKING A TRIGGER OF A WELDING GUN

(75) Inventor: Robert J. Centner, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/210,007

(22) Filed: Jul. 31, 2002

(65) Prior Publication Data

US 2004/0020908 A1    Feb. 5, 2004

(51) Int. Cl.[7] .............................. B23K 9/00; H01H 9/20
(52) U.S. Cl. ............................ 219/137.31; 200/43.17; 200/321; 200/332.2
(58) Field of Search ................... 219/137.31, 137.62, 219/137.63; 200/43.17, 43.21, 332, 332.2, 200/43.16, 43.19, 522, 321, 322

(56) References Cited

U.S. PATENT DOCUMENTS

| | | | | |
|---|---|---|---|---|
| 3,576,423 A | * | 4/1971 | Bernard et al. | 219/136 |
| 3,689,733 A | * | 9/1972 | Matasovic et al. | 219/137.63 |
| 3,827,171 A | * | 8/1974 | Smith | 42/69.03 |
| 4,250,366 A | * | 2/1981 | Erickson et al. | 200/332.2 |
| 4,376,240 A | * | 3/1983 | Stuart | 200/43.17 |
| 4,727,238 A | * | 2/1988 | Mann | 219/137.41 |
| 5,132,513 A | * | 7/1992 | Ingwersen et al. | 219/137.31 |
| 5,383,875 A | * | 1/1995 | Bays et al. | 606/1 |
| 5,388,362 A | * | 2/1995 | Melcher | 42/70.02 |
| 5,595,671 A | * | 1/1997 | David | 219/137.62 |
| 5,597,497 A | * | 1/1997 | Dean et al. | 219/121.48 |
| 5,698,122 A | * | 12/1997 | Lubieniecki et al. | 219/137.31 |
| 6,469,269 B1 | * | 10/2002 | Jong | 200/522 |

* cited by examiner

*Primary Examiner*—Kevin P. Kerns
(74) *Attorney, Agent, or Firm*—Fletcher Yoder

(57) ABSTRACT

A welding system having a welding gun. The welding gun is adapted with a trigger. The welding gun may have a lever to lock the trigger in a desired pivoted position. The lever may pivot the trigger as the lever is pivoted. The welding gun may have a trigger extension to enable a user to pivot the trigger by depressing the trigger extension. The trigger extension may be plastically deformed. The trigger extension may be removable. The trigger extension may be rotatable.

39 Claims, 4 Drawing Sheets

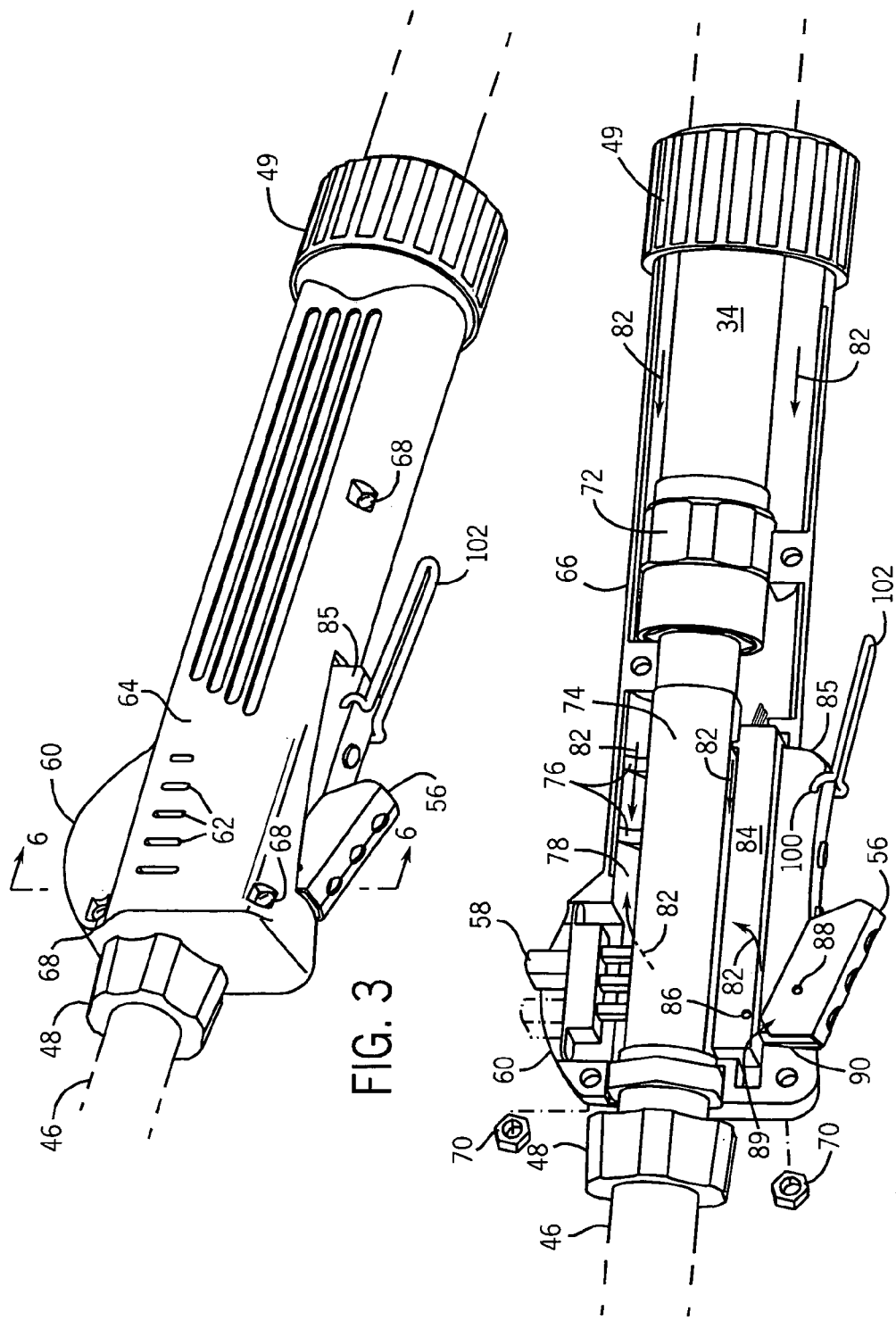

SYSTEM AND METHOD FOR OPERATING AND LOCKING A TRIGGER OF A WELDING GUN

FIELD OF THE INVENTION

The present invention relates generally to welding systems, and particularly to a welding system having a welding gun.

BACKGROUND OF THE INVENTION

Welding is a method of joining, or separating, metal objects. Arc welding is a common type of welding. An arc welding system typically is comprised of a power supply coupled by an electrical cable to a welding gun housing an electrode. A ground cable is used to connect the metal object to the power supply. The electrode in the welding handle completes an electrical circuit between the power supply and the metal object when the electrode is placed against the metal object, allowing electrical current to flow through the electrode and metal object. The electrical current produces an arc between the electrode and the metal object. The heat of the electric arc melts the object in the region surrounding the electric arc. A filler material may be added to the molten metal. For example, a wire may be placed against the molten portion of the object, melting the wire and allowing the molten wire to merge with the molten object. The circuit is broken and the molten mass begins to cool and solidify when the electrode is drawn away from the metal object, forming a weld.

There are several different types of welding systems and techniques. For example, MIG (Metal Inert Gas) welding is one type of arc welding. MIG welding is also referred to as "wire-feed" or GMAW (Gas Metal Arc Welding). In MIG welding, a metal wire is used as the electrode to produce the arc. Other welding systems use a rigid metal rod as the electrode. In MIG welding, for example, the weld area is shielded by an inert gas and the metal wire acts as a filler to add mass to the weld. The inert gas is used to shield the molten metal from outside contaminants and gases that may react with the molten material of the weld.

Many welding systems utilize a hand-held welding gun. Typically, the welding gun has a switch, or trigger, that is used to control the operation of the system. In MIG welding, for example, the wire and gas are fed to the welding gun from a wire feeder. The wire feeder is, in turn, coupled to a power source and a source of gas, such as a gas cylinder. The welding gun in a MIG system is used to direct the wire and gas to a desired location for welding. When the trigger is operated, wire is fed from the wire feeder to the welding gun. The gas and wire are directed to a workpiece by a neck secured to the handle. In other types of welding, flux, rather than gas, may be conveyed through the welding cable.

Different users have different preferences when it comes to holding the welding handle and operating the trigger. For example, some users may prefer holding the welding gun with their hand close to the trigger, while others may prefer to hold the welding gun further away from the trigger. In addition, a significant amount of heat may be generated within the handle of a welding gun, especially near the neck. Typically, a user will wear a welding glove to protect their hand from the heat produced during the welding. In addition, a user may try to hold the handle as far away from the neck as possible, but still within reach of the trigger.

In addition, the triggers of welding guns are typically spring biased. Typically, a user must overcome the spring bias to depress the trigger and initiate welding. Consequently, trigger locks have been developed to hold a trigger locked in a depressed position so that a user does not have to squeeze the trigger for an extended period of time. A typical trigger lock may have a stem, such as a pin, that extends through the trigger into a portion of the handle to maintain the trigger pivoted.

However, operation of a trigger or trigger lock may be difficult when wearing a welding glove. In addition, assembling the welding gun with the trigger locking assembly may be time-consuming. For example, to assemble the welding gun, the trigger and stem must be positioned in the welding handle so that the locking stem will be able to align with the hole in the welding handle.

There is a need for a welding gun that produces less heat and/or which enables a user to place their hands further away from a source of heat than existing welding guns. Additionally, there is a need for a trigger and trigger lock that may be operated easily by a user wearing a welding glove.

SUMMARY OF THE INVENTION

The present technique involves operating a welding gun of a welding system. The welding gun is adapted with a trigger. In accordance with one aspect of the present technique, the welding gun may have a lever to lock the trigger in a desired pivoted position. In accordance with another aspect of the present technique, the lever may pivot the trigger as the lever is pivoted.

According to another aspect of the present technique, the welding gun may have a trigger extension to enable a user to pivot the trigger by depressing the trigger extension. In some embodiments of the present invention, the trigger extension may be plastically deformable and/or removable. In accordance with still another aspect of the present invention, the trigger extension may be rotatable.

BRIEF DESCRIPTION OF THE DRAWINGS

The invention will hereafter be described with reference to the accompanying drawings, wherein like reference numerals denote like elements, and:

FIG. 3 is a perspective view of a portion of the welding gun of FIG. 2;

FIG. 4 is a perspective view of the welding gun of FIG. 2 with the left handle portion removed;

DETAILED DESCRIPTION OF THE PREFERRED EMBODIMENTS

Figure 1:
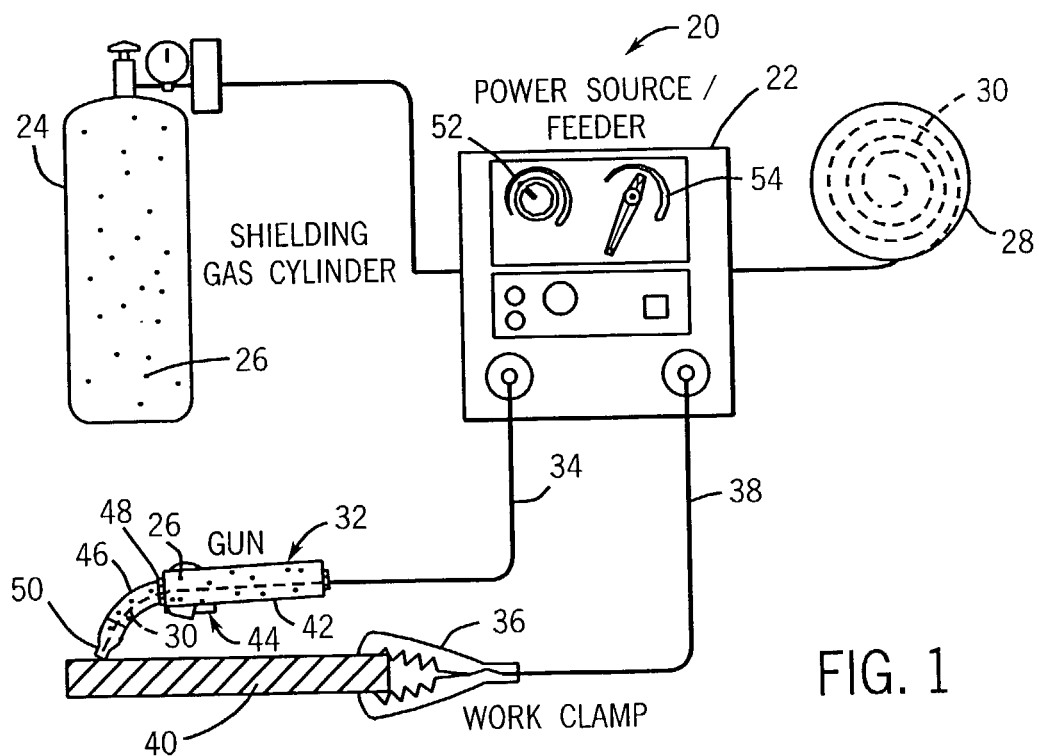
FIG. 1 is a diagram of a welding system, according to an exemplary embodiment of the present technique.

Referring generally to FIG. 1, an exemplary wire-feed metal inert gas ("MIG") welding system 20 is illustrated. However, the present invention is operable with a variety of welding systems, such as TIG welding or submerged-arc welding. The illustrated MIG welding system 20 comprises a power source/wire feeder 22, a gas cylinder 24 containing a gas 26 that is coupled to the power source/wire feeder 22, a spool 28 of electrode wire 30 that is coupled to the power source/wire feeder, a welding gun 32, a welding cable 34, a work clamp 36, and a return cable 38.

The power source/wire feeder 22 is a source of electric power and directs the feeding of gas 26 and wire 30 to the welding cable 34. The welding cable 34 is operable to route gas 26 and wire 30 from the power source/wire feeder 22 to the welding gun 32. The work clamp 36 is clamped onto the conductive workpiece 40 to be welded. The work clamp 36 and the return cable 38 electrically couple the power source/wire feeder 22 to the workpiece 40.

Figure 2:
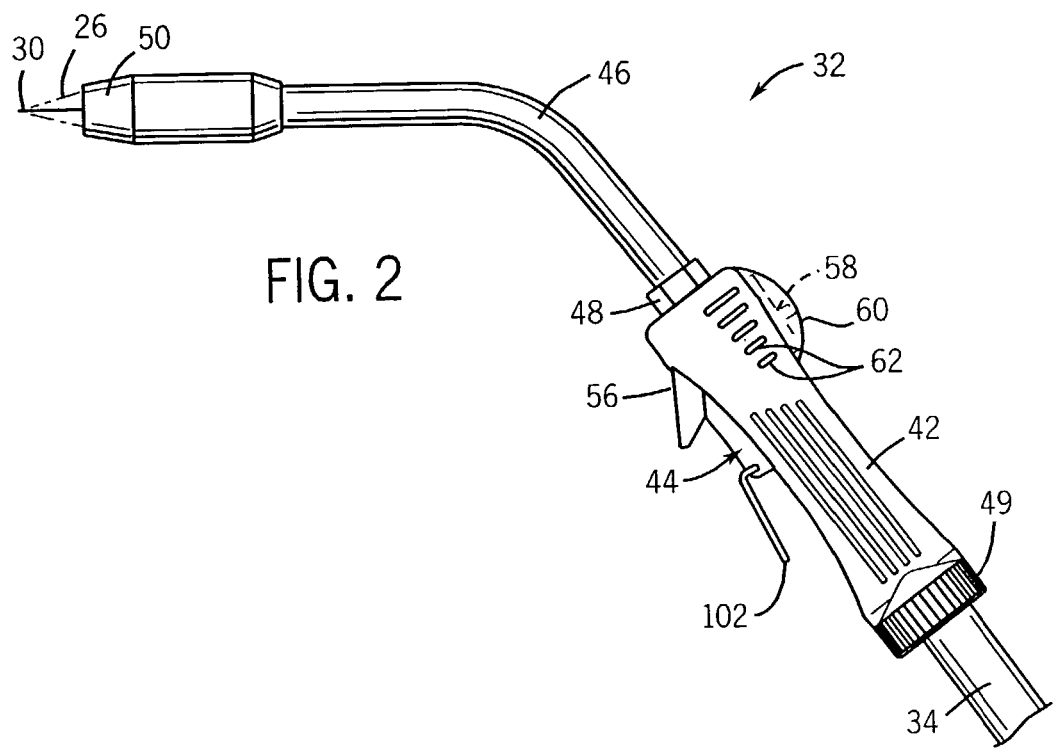
FIG. 2 is a front elevational view of a welding gun configured with the welding handle and trigger in a first orientation.

Referring generally to FIGS. 1 and 2, the welding gun 32 is used to direct the wire to the workpiece 40 and to control the application of wire 30 and power from the power source/wire feeder 22. Electricity flows from the power source/wire feeder 22 to the workpiece 40 through the welding cable 34 and welding gun 32. Electricity flows from the workpiece 40 to the power source/wire feeder 22 through the clamp 36 and return cable 38. The electricity produces an arc at the workpiece 40. The electric arc produces heat that melts a region of the workpiece 40 around the point of contact between the wire 30 and the workpiece 40. The heat of the arc melts the wire 30, such that the molten wire becomes a filler material. The inert gas 26 forms a shield that prevents harmful chemical reactions from occurring at the weld site. The pool of molten material solidifies when the arc is removed, forming the weld.

In the illustrated embodiment, the welding gun 32 comprises a handle 42, a trigger switch 44, a neck 46, a retaining nut 48, a handle-locking nut 49, and a nozzle 50. The retaining nut 48 is used to secure the neck 46 to the welding handle 42. The handle-locking nut 49 is used to secure the two pieces of the handle together to form the handle 42. The welding cable 34 also has an electrical cable (not shown) that is electrically coupleable to the trigger switch 44 and the power source/wire feeder 22. The trigger switch 44 enables a user to control the feeding of wire 30 from the welding gun 32. The trigger switch 44 may also be adapted to control the application of power from the power source/wire feeder 22 to the wire 30. In addition, the trigger switch 44 may be adapted to control the flow of gas from the welding gun 32. The wire 30 and gas 26 are fed through the neck 46 towards the workpiece 40. A nozzle 50 is used to direct the gas 26 towards the workpiece 40. A contact tip (not shown) is used to direct the wire towards the workpiece 40.

The power source/wire feeder 22 may be a single combined unit or have a separate power source and wire feeder. Also, the power source/wire feeder 22 may have a variety of different features. For example, the power source/wire feeder 22 may have a wire speed control 52 to enable a user to control the speed at which wire 30 is fed from the power source/wire feeder 22. In the exemplary embodiment illustrated, the power source/wire feeder 22 also has a variable voltage and/or current control 54 to enable a user to control the voltage and/or current produced by the power source.

In this embodiment, the power source/wire feeder 22 is operable for dual schedule operation. In dual schedule operation, the power source/wire feeder 22 is operable to store settings for at least one operating parameter for at least two different settings. For example, the power source/wire feeder 22 may have a first setting for operating at a first voltage and a second setting for operating at a second voltage. The power source/wire feeder 22 may be switched between the two settings by a switch. The power source/wire feeder 22 also may have standard features.

Referring generally to FIGS. 2 and 3, the welding gun 32 has a locking lever 56 that is operable to hold the trigger switch 44 depressed. In addition, a dual schedule switch 58 is located on a portion of the welding handle 42. One exemplary dual schedule switch 58 is a sliding switch. In the illustrated embodiment, the welding handle 42 is adapted to integrate the dual schedule switch 58 into the handle 42. In addition, the handle 42 is adapted with a wall portion 60 surrounding the dual schedule switch 58 to prevent inadvertent operation of the switch 58. Electrical control leads (not shown) are used to electrically couple the trigger switch 44 and the dual schedule switch 58 to the power source/wire feeder 22. Furthermore, handle 42 is adapted with a plurality of ventilation holes 62 that enable air flow through the handle 42 to cool the handle 42.

Figure 5:
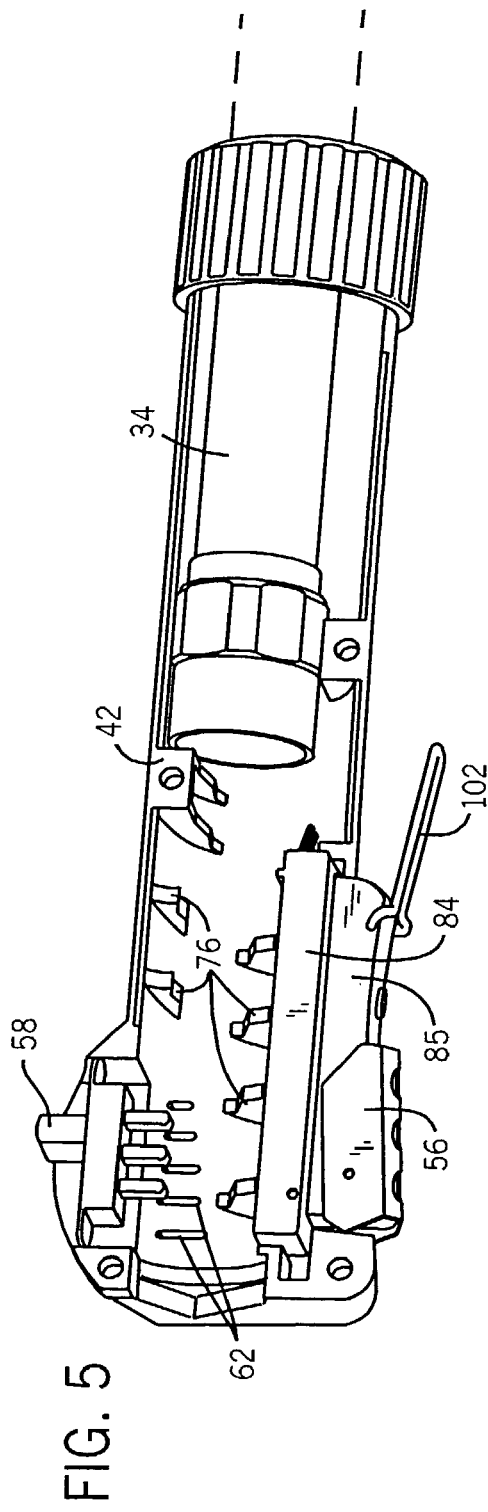
FIG. 5 is a perspective view of a handle portion, according to an exemplary embodiment of the present technique.

Referring generally to FIGS. 3–5, the welding handle 42 comprises a left handle piece 64 and a right handle piece 66. The left and right handle pieces 64, 66 are adapted to receive the welding cable 34, the trigger switch 44, and the dual schedule switch 58. The left and right handle pieces are secured to each other by the handle-locking nut 49, as well as several screws 68 and nuts 70. The welding cable 34 is adapted with a cone nut 72 in the illustrated embodiment. The cone nut 72 is tapered to fit into the end of the welding cable 34. The welding handle 42 also is adapted to receive an end fitting 74. The end fitting 74 is adapted to couple the cone nut 72 to the neck 46 of the welding gun. The neck 46 is secured to the end fitting 74 by the retaining nut 48. The cone nut 72 and endfitting 74 are electrically conductive to enable electricity to flow from the welding cable 34 to the neck 46. From the neck, electricity is coupled to the electrode wire 30 through a contact tip (not shown) in the nozzle 50. In addition, the end nut 72 and end fitting 74 are hollow to enable gas to flow from the welding cable 34 to the neck 46. Preferably, the cone nut 72 and end fitting 74 are comprised of brass. However, other materials may be used. In the illustrated embodiment, the ventilation holes 62 are located on the handle 42 adjacent to the end fitting 74 to remove heat from the interior of the welding handle 42, such as heat produced by the electric current flowing through the end fitting 74.

Figure 6:
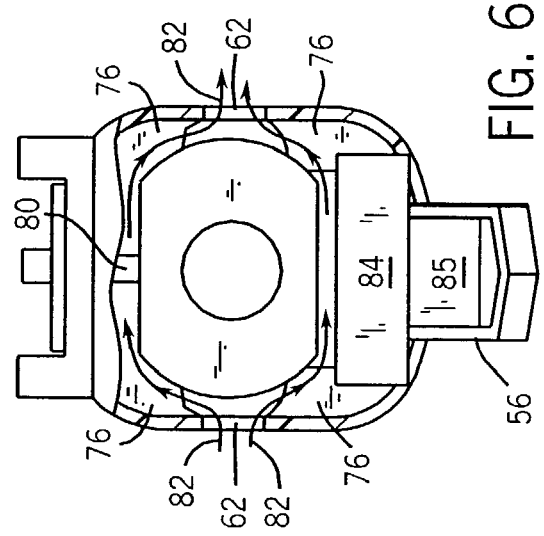
FIG. 6 is a cross-sectional view of the welding gun, taken generally along lines 6—6 of FIG. 3, according to an exemplary embodiment of the present technique.

Referring generally to FIGS. 4–6, the welding handle 42 is adapted to direct a flow through the interior of the welding handle. In the illustrated embodiment, the welding handle 42 is adapted to provide a plurality of flow paths for cooling air to flow through the handle 42. In this embodiment, each of the handle pieces has a plurality of reinforcing ribs 76. The reinforcing ribs 76 extend around the end fitting 76 to support the end fitting 74. When the handle pieces 64, 66 are secured together, the reinforcing ribs 76 form air chambers 78 around the end fitting 74. The reinforcing ribs 76 do not extend completely around the end fitting 74 in this embodiment. Rather, a plurality of gaps 80 are formed between each of the corresponding reinforcing ribs 76 of the left and right handle pieces 64, 66, as best illustrated in FIG. 6. The gaps 80 enable air 82 to flow longitudinally along the end fitting 74, as illustrated in FIG. 4. The air 82 may flow from the rear of the welding gun 32 towards the ventilation holes 62. Alternatively, the air 82 may flow from the ventilation holes 62 to the rear of the welding gun 32. In this embodiment and in this view, the gaps 80 are formed above and below the end fitting 74. Alternatively, the gaps 80 may be formed only on one side of the end fitting 74.

In addition, the handle pieces 64, 66 are adapted to enable air 82 to flow from the ventilation holes 62 of one handle piece to the ventilation holes 62 of the opposite handle piece. The air 82 may flow from left-to-right or right-to-left through the interior of the handle 42. As illustrated in FIG. 6, the ribs 76 are adapted to enable air 82 to flow radially around the end fitting 76 to cool the end fitting 76. Air 82 flowing longitudinally through the handle 32 may merge with the air flowing radially through the handle 42.

Figure 7:
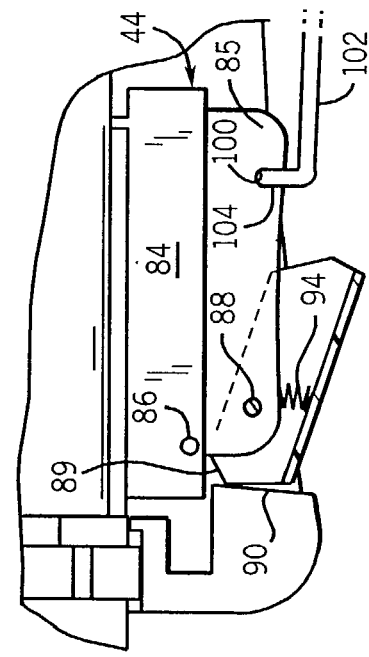
FIG. 7 is a detailed view of the trigger and locking lever of the welding gun of FIG. 3, illustrating the trigger and locking lever in a relaxed condition.
Figure 8:
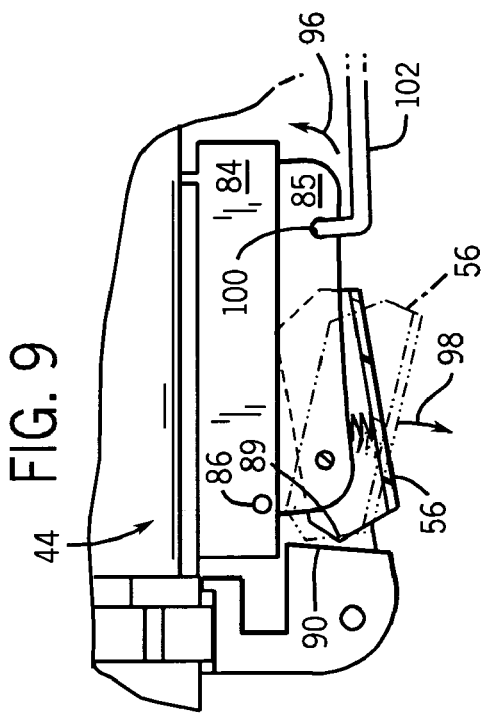
FIG. 8 is a detailed view of the trigger and locking lever of the welding gun of FIG. 3, illustrating the trigger and locking lever in a depressed condition.
Figure 9:
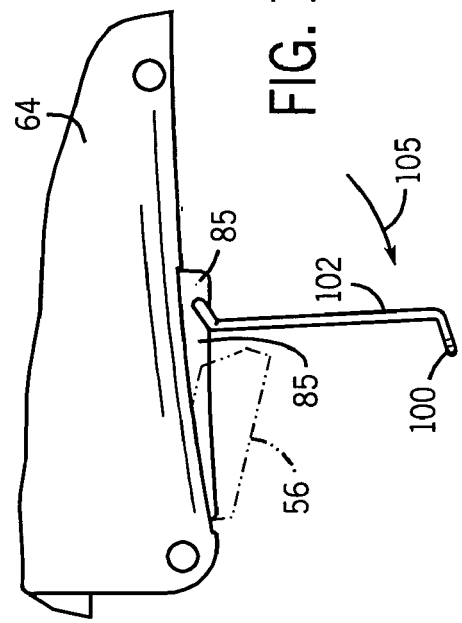
FIG. 9 is a detailed view of the trigger and locking lever of the welding gun of FIG. 3, illustrating the depression of the trigger to release the locking lever.

Referring generally to FIGS. 7–9, the trigger switch 44 has a base portion 84 and a pivotable trigger 85. The base portion 84 is secured to the handle 42 by the left and right end pieces 64, 66. The trigger 85 is pivotable about a pivot point 86 from a relaxed position, as illustrated in FIG. 7., to a depressed position, as illustrated in FIG. 8. The trigger switch 44 has a spring (not shown) to bias the trigger 85 to the relaxed position. Preferably, contacts within the trigger switch 44 are closed when the trigger 85 is pivoted to the depressed position and the contacts are open when the trigger 85 is positioned to the relaxed position. The position of the contacts, open or closed, provides a signal to the power source/wire feeder 22.

As illustrated in FIG. 8, the trigger switch 44 is engaged by depressing the trigger 85 toward the base portion 84, as represented by the arrow 87. In an unlocked condition, the trigger 85 is biased to return to the disengaged position when the trigger 85 is released. However, in a locked condition, the trigger 85 will remain in the depressed position when the trigger 85 is released. The locking lever 56 is adapted to lock the trigger 85 in the depressed position to maintain the trigger switch 44 engaged. In addition, in this embodiment, the locking lever 56 is adapted to pivot the trigger 85 from the relaxed position to the depressed position as the locking lever 56 is pivoted into locking position. The locking lever 56 and trigger 85 have a hole to receive a pin 88 therethrough. The pin 88 enables the locking lever 56 to pivot relative to the trigger switch 44. However, other methods of pivoting the locking lever 56 relative to the trigger 85 are available.

In the illustrated embodiment, the locking lever 56 has a cam portion 89 that is adapted to cooperate with a portion 90 of the left and right handle pieces 64, 66. As the locking lever 56 is depressed toward the trigger 85, as represented by arrow 92, the cam portion 89 engages the portion 90 of the left and right handle pieces 64, 66. This cooperation between the cam portion 89 and an adjacent portion 90 of the left and right handle pieces 64, 66 pivots the trigger 85 toward the depressed position. Friction between the cam portion 89 of the locking lever 56 and the adjacent portions 90 of the left and right handle pieces 64, 66 prevent the trigger 85 from disengaging. Pivoting the locking lever 56 to lock the trigger 85 in a depressed condition is easier to perform while wearing a welding glove than is pushing a button. In the illustrated embodiment, a spring 94 is disposed between the locking lever 56 and the trigger 85. The spring 94 is compressed as the locking lever 56 is pivoted toward the trigger 85.

As illustrated in FIG. 9, the locking lever 56 is released by slightly depressing the trigger 85, as represented by the arrow 96. When the trigger 85 is depressed, the cam portion 89 of the locking lever 56 is drawn away from the adjacent portion 90 of the left and right handle pieces 64, 66. The locking lever 56 is then free to rotate. The spring 94 urges the locking lever 56 to its unlocked position, as represented by the arrow 98.

Figure 10:
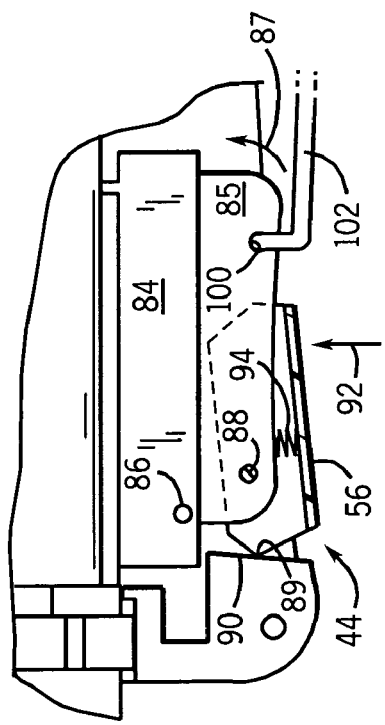
FIG. 10 is a detailed view of a trigger and trigger extension, illustrating the operation of the trigger by the trigger extension, according to an exemplary embodiment of the present technique.

Referring generally to FIGS. 9 and 10, the trigger 85 is adapted with a hole 100 to enable a trigger extension 102 to be secured to the trigger 85. Typically, the hottest portion of a handle is adjacent to the neck. In the illustrated embodiment, the trigger extension 100 enables a user to place their hand a greater distance from the neck 46 and still be able to operate the trigger 85. Preferably, the trigger extension 102 is made of a malleable material, such as wire, that may be plastically deformed to retain a desired shape. In the illustrated embodiment, the trigger extension 102 is formed of a metal wire and has a generally U-shape. The U-shape of the trigger extension 102 enables the ends 104 of the trigger extension 102 to be easily inserted or withdrawn from the holes 100 in the trigger 85 to install or remove the trigger extension 102. As illustrated in FIG. 10, the trigger switch 44 may be engaged by depressing the trigger extension 102 to depress the trigger 85.

Figure 11:
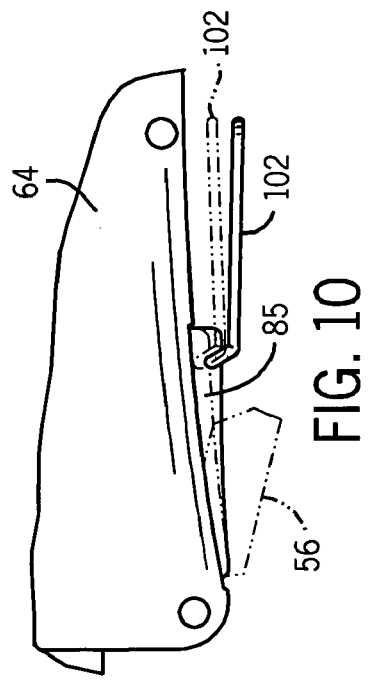
FIG. 11 is a detailed view of a trigger and trigger extension, illustrating the trigger extension in a rotated position, according to an exemplary embodiment of the present technique.

As illustrated in FIG. 11, the trigger extension 102 also is operable to rotate relative to the trigger 85, as represented by the arrow 105. The trigger extension 102 will rotate if a user attempts to hang the welding gun 32 by the trigger extension 102, thereby preventing the trigger extension 102 from being broken due to the weight of the welding gun 32 and the welding cable 34. In addition, the malleability of the trigger extension 102 enables a user to form the trigger extension 102 to a desired shape. For example, a user may prefer the trigger extension 102 to have a degree of curvature at the end, while another user may prefer the trigger extension 102 to be straight. In the illustrated embodiment, the trigger extension 102 has been plastically deformed to have a curved end 106.

It will be understood that the foregoing description is of preferred exemplary embodiments of this invention, and that the invention is not limited to the specific forms shown. Modifications may be made in the design and arrangement of the elements without departing from the scope of the invention as expressed in the appended claims.

What is claimed is:

1. A trigger assembly for a welding gun having a handle, comprising:
   a base portion securable to the handle;
   a trigger pivotable relative to the base portion between activated and deactivated positions; and
   a lever pivotable relative to the trigger, wherein the lever is adapted to lock the trigger in the activated position.

2. The trigger assembly as recited in claim 1, wherein the lever is pivotable between a first position and a second position.

3. The trigger assembly as recited in claim 2, wherein the lever urges the trigger toward the activated position as the lever is pivoted from the first position toward the second position.

4. The trigger assembly as recited in claim 2, wherein pivotable movement of the lever toward the first position is obstructed by the handle when the lever is disposed in the second position.

5. The trigger assembly as recited in claim 4, wherein the lever is adapted with a cam portion that abuts the handle when the lever is positioned to the second position.

6. The trigger assembly as recited in claim 5, wherein the cam portion of the lever is drawn away from the handle as the trigger is pivoted from the activated position to a position toward the handle.

7. The trigger assembly as recited in claim 6, comprising a biasing spring adapted to pivot the lever away from the trigger when the cam portion is drawn away from the handle.

8. The trigger assembly as recited in claim 1, comprising a removable trigger extension adapted to direct pivotal movement of the trigger, wherein the trigger is adapted to receive the removable trigger extension.

9. The trigger assembly as recited in claim 8, wherein the trigger extension is pivotable relative to the trigger.

10. The trigger assembly as recited in claim 9, wherein the trigger extension is plastically deformable.

11. A trigger extension for a welding gun, comprising:
a plastically-deformable member pivotably secured to a pivotable trigger and operable to act as a lever to direct pivotal movement of the trigger.

12. The trigger extension as recited in claim 11, wherein the member is removably secured to the trigger.

13. The trigger extension as recited in claim 11, wherein the trigger is secured to a handle and the trigger extension has a length to enable a user to operate the trigger with the user's hand located in the middle of the handle.

14. The trigger extension as recited in claim 11, wherein the trigger is located at one end of a handle relative to the middle of the handle and the trigger extension has a length to enable a user to operate the trigger with the user's hand located on the opposite end of the handle.

15. A welding gun, comprising:
a handle;
a trigger pivotably secured to the handle and positionable between first and second positions, wherein transition of the trigger from the first position to the second position pivots the trigger towards the handle; and
a pivotable lever adapted to secure the trigger at the second position.

16. The welding gun as recited in claim 15, wherein the lever is pivotable relative to the trigger.

17. The welding gun as recited in claim 16, wherein the lever abuts a portion of the handle to lock the trigger at the second position.

18. The welding gun as recited in claim 17, wherein the lever is pivotable from a third position wherein the trigger is unlocked to a fourth position wherein the trigger is locked, the welding gun comprising a biasing member adapted to bias the lever toward the third position.

19. The welding gun as recited in claim 15, comprising a welding cable, wherein the handle is secured to the welding cable.

20. The welding gun as recited in claim 15, comprising a trigger extension removably secured to the trigger.

21. The welding gun as recited in claim 20, wherein the trigger extension is pivotable relative to the trigger.

22. The welding gun as recited in claim 20, wherein the trigger extension is plastically deformable.

23. A welding system, comprising:
a power source;
a cable coupleable to the power source; and
a welding gun coupled to the cable, comprising:
a handle;
a trigger secured to the handle and coupleable to the power source and pivotable between a first position and a second position relative to the handle, wherein transition of the trigger from the first position to the second position pivots the trigger towards the handle; and
a pivotable lever adapted to lock the trigger in the second position.

24. The system as recited in claim 23, wherein the lever is pivotably secured to the trigger.

25. The system as recited in claim 23, wherein the lever is pivotable between a third and a fourth position relative to the trigger, wherein the lever urges the trigger toward the fourth position relative to the handle as the lever is pivoted toward the fourth position relative to the trigger.

26. The system as recited in claim 24, wherein the lever is prevented by the handle from pivoting toward the third position relative to the trigger when the lever is disposed in the fourth position relative to the trigger.

27. The system as recited in claim 26, wherein the trigger is released from the lever by pivoting the trigger toward the handle such that a cam portion of the lever is displaced from abutment with the handle.

28. The system as recited in claim 23, comprising a wire feeder coupled to the power source to advance electrode wire through the cable.

29. The system as recited in claim 28, wherein the trigger is operable to control the advance of electrode wire from the wire feeder.

30. A welding gun, comprising:
a pivotable lever adapted to pivot a trigger to an activated position and to lock the trigger at the activated position, wherein the trigger is operable to control feeding of electrode wire from a wire feeder coupleable to the welding gun.

31. The welding gun as recited in claim 30, wherein the lever is pivotably secured to the trigger.

32. The welding gun as recited in claim 30, comprising a biasing spring adapted to pivot the lever away from the trigger.

33. A method of operating a welding system, comprising:
pivoting a lever of a welding gun from a first position to a second position to urge a trigger of the welding gun to an activated position and to lock the trigger in the activated position.

34. The method as recited in claim 33, wherein a signal is provided to the welding system to initiate an operation when the trigger is pivoted to the activated position.

35. A method of operating a welding system, comprising:
securing a pivotable trigger extension to a pivotable trigger of a welding gun; and
urging the trigger extension toward a handle of the welding gun to depress the trigger to an activated position.

36. The method as recited in claim 35, comprising removing the trigger extension.

37. The method as recited in claim 35, wherein securing a rotatable trigger extension to a trigger comprises securing a rotatable trigger extension to a trigger without use of a tool.

38. The method as recited in claim 36, wherein removing the trigger extension comprises removing the trigger extension without use of a tool.

39. The method as recited in claim 35, comprising rotating the trigger extension from a first position to a second position to enable the trigger extension to engage the trigger.

* * * * *